Oct. 27, 1931.    W. M. ROY    1,828,950
TURNING SIGNAL SWITCH
Filed April 29, 1929    2 Sheets-Sheet 1
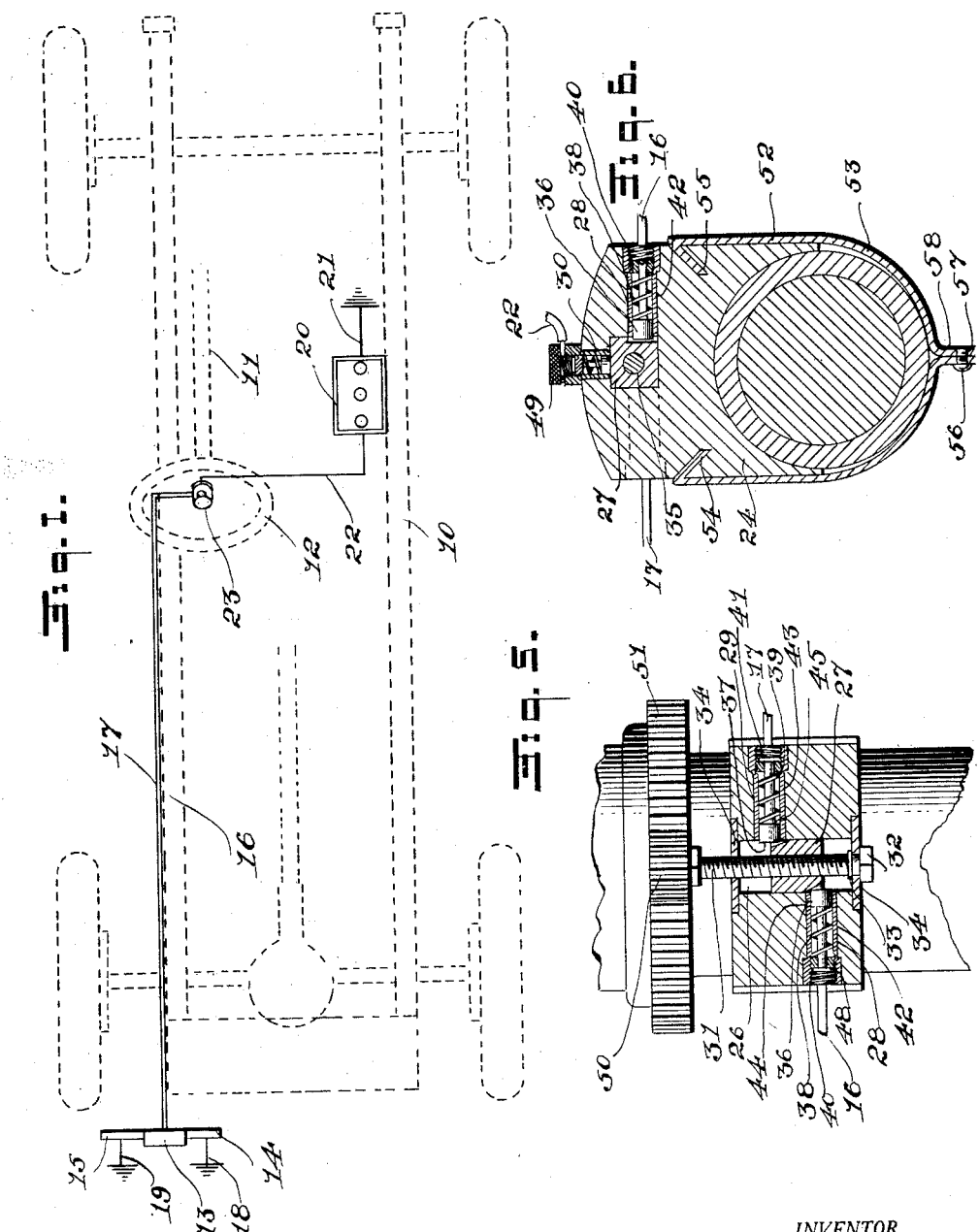
INVENTOR.
Walter M. Roy
BY
Joshua R. H. Potts
ATTORNEY.

Oct. 27, 1931.  W. M. ROY  1,828,950
TURNING SIGNAL SWITCH
Filed April 29, 1929  2 Sheets-Sheet 2
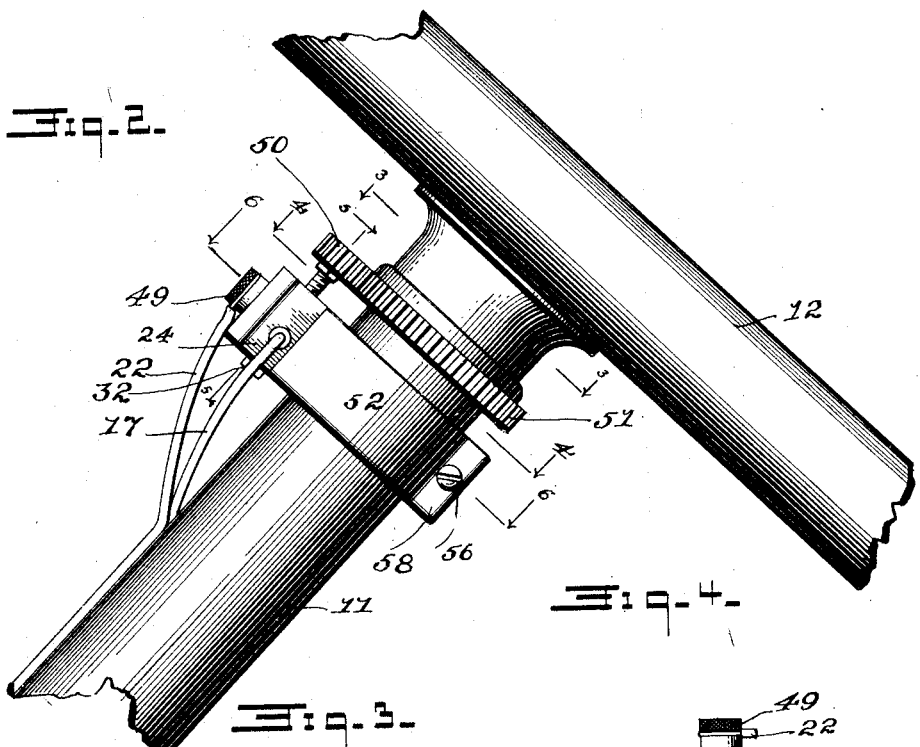
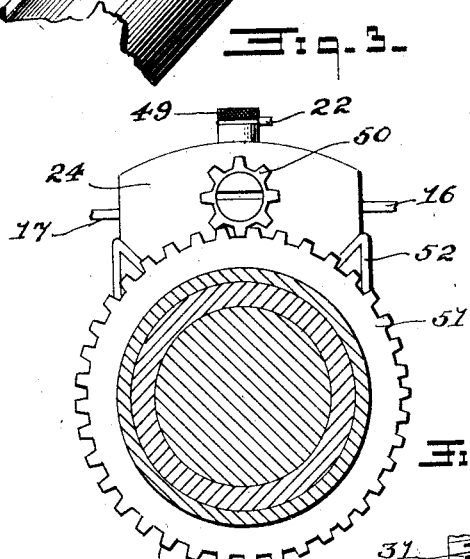
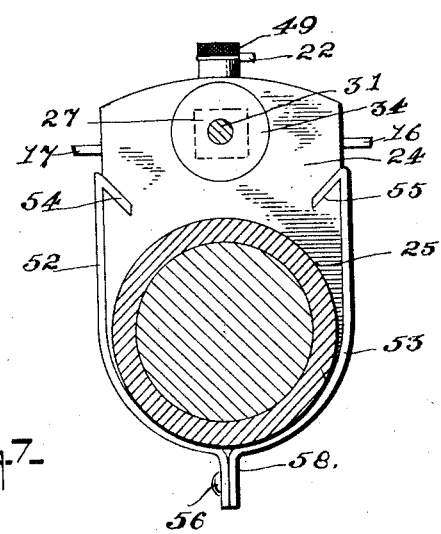
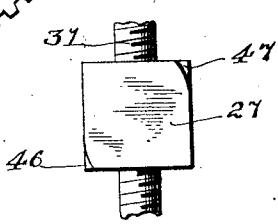
INVENTOR.
Walter M. Roy Patented Oct. 27, 1931

1,828,950

UNITED STATES PATENT OFFICE

WALTER M. ROY, OF DEVON, PENNSYLVANIA

TURNING SIGNAL SWITCH

Application filed April 29, 1929. Serial No. 358,832.

The present invention relates to electric signal circuits and particularly to switch mechanism for controlling a plurality of such circuits incident to the steering of movements of the steering wheel.

An object of the invention is to improve switch mechanism of this character.

A further object is to provide a switch mechanism of this character which will be positive and dependable in its operation and responsive to movement of the dirigible mechanism of the vehicle.

A still further object of the invention is to facilitate the attachment of the switch mechanism to the support therefor and the adjustment of the various parts of the switch mechanism to each other.

The switch mechanism constructed in accordance with this invention consists in a block or casing mountable on a stationary part of a vehicle, as to the steering post, having terminals of circuits thereon and a switch for closing one or the other of said circuits for operating a signal, together with means responsive to the turning of the steering wheel for operating the switch.

The switch specifically disclosed in this application constitutes a contact block slidable in a slideway in which the terminals of the circuits are positioned in spaced relation to each other and the block caused to slide by means of a threaded connection thereof with a shaft or shank rotatably mounted in the slideway. Operating connection between the steering wheel and the shaft is provided in the nature of a pinion and gear, the pinion being connected to the shaft and the gear to the steering wheel.

The mounting of the switch mechanism is preferably adjustably effected by means of resilient arms detachably connected with the block and having means associated therewith for exerting a tensioning influence on said arms to bind them about the post.

For a better understanding of the invention, reference may be had to the drawings illustrating an embodiment of my invention, in which Figure 1 is a diagrammatic view showing the relation of the invention to a vehicle and the signal lights thereon, Figure 2 is a fragmentary view on an enlarged scale of the steering post and steering wheel with parts of the mechanism of the invention attached thereto, Figure 3 is a section on the line 3—3 of Figure 2, further illustrating the connection of the operating mechanism to the steering posts and the steering wheel, and the driving connection between the several parts, Figure 4 is a section on line 4—4 of Figure 2 showing the connection of the switch housing to the steering post, Figure 5 is a section on line 5—5 of Figure 2 showing the manner of making and breaking the several circuits which include the signal lights, and Figure 6 is a section on line 6—6 of Figure 2 showing further the relation of the switch mechanism to the switch block.

Figure 7 is a fragmentary detailed view on a further enlarged scale illustrating the switch mechanism.

Referring to the drawings in detail by reference numerals, 10 designates a vehicle having a stationary steering post 11 and a rotatable steering wheel 12 of the usual character. 13 designates a tail-light on either side of which, as at 14 and 15, are arranged signal lights for indicating the direction in which the operator of the vehicle intends to turn.

16 and 17, respectively, indicate circuits including respectively the signals 14 and 15. One side of each of these signal members is grounded, as shown at 18 and 19 and in a similar manner a battery 20 provided having one pole thereof grounded, as indicated at 21.

For the sake of clearness, the vehicle in Figure 1 is represented in dotted lines and the inventive features are represented in full lines.

The circuits 16 and 17 has included therein the conductor 22 suitable switch mechanism 23 by means of which the setting of the signals is under the control of the driver of the vehicle. For convenience of control and in order to render the same automatical incident to the steering of the vehicle, the switch mechanism 23 may be connected to the steering post and operated through mechanism connected to the hub of the steering wheel in the following manner.

The switch mechanism may be, of course, attached to any stationary part of the vehicle. A convenient part for this purpose is the steering post 11 referred to above. This switch mechanism comprises a block or casing 24 having a portion 25 thereof cut to provide a surface conforming to the contour of the steering post and this surface is held in contact with the steering post in any suitable manner. Means for this purpose will be hereinafter described.

The switch block is provided with a slideway 26 shown clearly in Figures 5 and 6 of the drawings which may be rectangular in cross-section or of any other suitable shape to prevent a turning movement of a contact block or switch 27 slidable in the slideway. The block is also provided with bores 28, 29 and 30 in which are placed terminal contact members suitably connected with the respective conductors 16, 17 and 22. These bores may be arranged at an angle to the slideway and are shown as communicating therewith at right angles thereto.

Journaled longitudinally of the slideway is a threaded shank or shaft 31 being held against longitudinal movements by the tap 32 and the collar 33 on either side of one of the bearing members 34 in which the shaft is rotatably mounted. The block 27 is in threaded connection with the shaft 31, as by a bore 35 extending therethrough.

It is obvious that the rotation of this shaft will cause the block to move longitudinally of the slideway whereby the same contacts with one or the other of the terminals of the conductors 16 and 17, the block being at all times in contact with the terminal of the conductor 22.

The terminals connected with the conductors 16 and 17 comprise contact members 36 and 37 urged toward the slideway by springs 38 and 39. These springs are under tension between plugs 40 and 41 respectively and shoulder 44 and 45 formed on the contact members threaded into the outer ends of the bores, the bores preferably being suitably lined by means of insulating tubes 42 and 43.

The switch block is formed at its opposite ends with sloping portions 46 and 47 to facilitate the riding of the contact members 36 and 37 thereupon. The contact members are prevented from being projected unduly into the slideway by means of pins 48 extending transversely of the contact members and being limited in their movement toward the slideway by the plugs 40 and 41. A similar construction is provided as for the terminal of the conductor 22. In each case the conductors is bound to the contact members by suitable thumb screws 49.

The shaft 31 has connected thereto for rotation therewith a pinion 50, the teeth of which mesh with similar teeth of a gear 51 secured to the hub of the steering wheel. It will appear, therefore, that when the steering wheel is turned beyond a certain angle from that for directing the vehicle straight ahead that a contact will be made between the switch block 27 and one of the terminals 36 or 37, completing a circuit through either the signal 14 or 15 including the battery 20.

Inasmuch as a part of the operating mechanism for the switch is mounted on the steering post and other of said mechanism on the hub of the steering wheel, facility in the mounting and adjustment of these parts is quite desirable. For this purpose I have provided in connection with the block or housing 24 arms 52 which may be curved, as at 53, to conform with the surface of the steering post and to compliment the surface 25 in gripping the same.

The members 52 may be detachable from the block and may be connected therewith by means of hooked ends 54 adapted to be projected into notches or recesses 55 formed in said block or housing. The members 52 may also be of resilient material, as of sheet metal, and tension may be placed thereon when placed around the steering post by means of a screw 56 threaded in apertures 57 formed in radially extending ears 58 on the ends of the arms opposite to the hooks 54.

By this arrangement it will appear that the block or housing 24 may be moved longitudinally of the steering post until the pinion 30 articulates with the gear 51 and the block may then be secured against displacement in this position by tightening the arms around the steering post by means of the screw 57.

The operation of the mechanism when in place briefly is as follows:

When the steering wheel is turned either in a clockwise or anti-clockwise direction, as when steering to the right or to the left, the gear 51 will cause the pinion 50 to rotate which in turn will cause a rotation of the shaft 31 and a movement of the switch block 27 along the slideway in the direction according to the direction in which the steering wheel is turned. When the wheel has been turned a certain distance contact with one or the other contact members associated with the conductors 16 and 17 will be made and the light or other signal at 14 or 15, as the case may be, caused to operate. When the wheel is in position for directing the vehicle straight ahead, the block 27 will be in a neutral position between the two contacts 36 and 37 and no signal will be made.

It will be understood that various changes in details may be made in the above described construction within the scope of the invention as hereinbefore set forth and hereinafter claimed.

I claim:—

A switch mechanism comprising an insulating body having a wholly enclosed slideway therein, a block of conducting material mounted to slide in the slideway, a terminal midway of the slideway in sliding contact with the block, other terminals spaced from said first mentioned terminal and adapted to make sliding contact electively with the block upon its movement in either direction from a mean position the while continuing contact with the first mentioned terminal, a worm extended through said slideway and said block, and means to rotate the worm.

In testimony thereof I have signed my name to this specification.

WALTER M. ROY.